(12) United States Patent
Cottam et al.

(10) Patent No.: US 10,191,871 B2
(45) Date of Patent: Jan. 29, 2019

(54) SAFE DOUBLE BUFFERING USING DMA SAFE LINKED LISTS

(71) Applicant: Infineon Technologies AG, Neubiberg (DE)

(72) Inventors: Simon Cottam, Bristol (GB); Patrice Woodward, Sodbury (GB)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/627,872

(22) Filed: Jun. 20, 2017

(65) Prior Publication Data

US 2018/0365181 A1 Dec. 20, 2018

(51) Int. Cl.
*G06F 13/28* (2006.01)
*G06F 13/16* (2006.01)

(52) U.S. Cl.
CPC .......... *G06F 13/28* (2013.01); *G06F 13/1642* (2013.01)

(58) Field of Classification Search
CPC .............................. G06F 13/1642; G06F 13/28
USPC .......................................................... 710/28
See application file for complete search history.

(56) References Cited

U.S. PATENT DOCUMENTS

| | | | | |
|---|---|---|---|---|
| 5,224,213 A | * | 6/1993 | Dieffenderfer | ............ G06F 5/16 710/53 |
| 5,513,374 A | * | 4/1996 | Baji | ........................ G06F 13/32 710/26 |
| 5,590,377 A | * | 12/1996 | Smith | ..................... G06F 13/28 710/22 |
| 5,805,927 A | * | 9/1998 | Bowes | .................. G06F 13/128 710/23 |
| 5,828,903 A | * | 10/1998 | Sethuram | ................ G06F 13/28 710/53 |
| 6,111,592 A | * | 8/2000 | Yagi | ........................ G06F 13/28 345/537 |
| 6,167,465 A | * | 12/2000 | Parvin | ..................... G06F 13/28 370/402 |
| 6,202,107 B1 | | 3/2001 | Collier | |
| 6,874,054 B2 | | 3/2005 | Clayton et al. | |
| 7,003,702 B2 | | 2/2006 | Budd et al. | |
| 7,222,197 B2 | | 5/2007 | Jeddeloh | |
| 7,496,695 B2 | | 2/2009 | Go et al. | |
| 7,620,746 B2 | | 11/2009 | Go et al. | |
| 8,032,724 B1 | * | 10/2011 | Smith | ................. G06F 12/0269 711/159 |

(Continued)

*Primary Examiner* — Paul R. Myers
(74) *Attorney, Agent, or Firm* — Eschweiler & Potashnik, LLC

(57) ABSTRACT

In some embodiments, a DMA controller includes a set of transaction control registers configured to receive a linked list sequence of transaction control sets. The transaction control sets collectively describe a data transfer by which the DMA controller is to move data from a peripheral alternatingly to a first memory buffer and a second memory buffer, wherein the first and second memory buffers are arranged in parallel with one another at an interface of the peripheral. The DMA controller is configured to transfer a first set of data from the peripheral to the first memory buffer according to a first transaction control set in the linked list sequence, and is configured to subsequently transfer a second set of data from the peripheral to the second buffer according to a second transaction control set in the linked list sequence.

20 Claims, 5 Drawing Sheets

(56) References Cited

U.S. PATENT DOCUMENTS

| | | | |
|---|---|---|---|
| 2004/0151170 A1* | 8/2004 | Gulati | H04L 49/9015 370/360 |
| 2005/0289253 A1 | 12/2005 | Edirisooriya et al. | |
| 2008/0147908 A1 | 6/2008 | Lahti et al. | |
| 2008/0222317 A1 | 9/2008 | Go et al. | |
| 2009/0271536 A1* | 10/2009 | Tiennot | G06F 13/28 710/28 |
| 2009/0310489 A1* | 12/2009 | Bennett | G06F 13/4278 370/236 |
| 2014/0108869 A1 | 4/2014 | Brewerton et al. | |

* cited by examiner

SAFE DOUBLE BUFFERING USING DMA SAFE LINKED LISTS

BACKGROUND

For safety related applications, it is important to ensure microcontrollers correctly execute their intended functionality in all phases of the application. The execution assumes correctness of both hardware and software components with respect to their specification and fault-free execution of this functionality. In general, safety related applications are built using special measures to avoid systematic faults and to detect and react to possible random hardware faults during execution of the application.

BRIEF DESCRIPTION OF THE DRAWINGS

FIG. 4 illustrates data transfer from a source peripheral to first and second source memory buffers (FIG. 4) using safe linked lists, and FIG. 5 illustrates data transfer from first and second destination memory buffers to a destination peripheral using safe linked lists.

DETAILED DESCRIPTION

Figure 1:
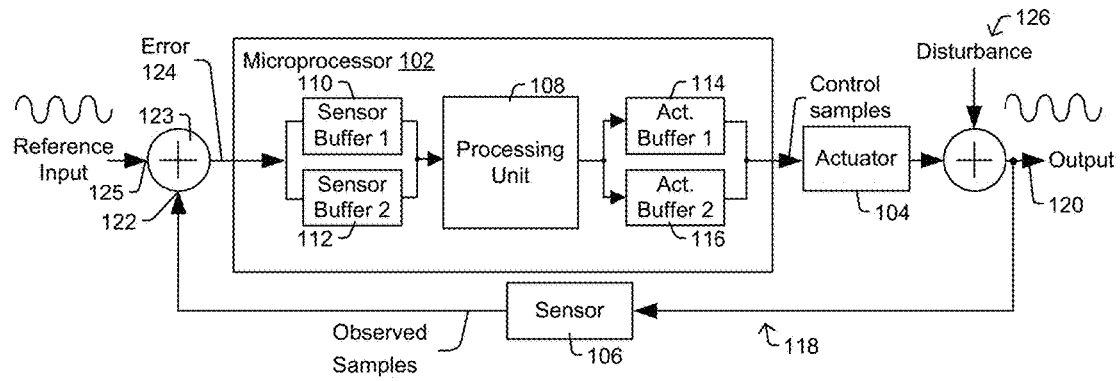
FIG. 1 shows a block diagram of a safety system that includes an actuator, sensor, and microprocessor.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

Further, it will be appreciated that the terms "first", "second", "third", and the like, are merely generic identifiers and do not suggest temporal, spatial, or other relationships between various elements. Also, the terms may be switched between various embodiments, such that a "first" memory buffer in one embodiment can correspond to a "second" memory buffer in another embodiment, and so on.

FIG. 1 illustrates an example of a safety system 100 that includes a microprocessor 102, actuator 104, and sensor 106. The microprocessor 102 includes a processing unit 108, first and second sensor memory buffers 110, 112, and first and second actuator memory buffers 114, 116. A feedback path 118 couples an output terminal 120 through the sensor 106 back to a first input terminal 122 of comparator or adder 123.

During operation, the actuator 104 is expected to promote a movement or control operation at the output terminal 120. Ideally, the movement or control operation at the output terminal 120 exactly tracks a reference input signal provided at a second input terminal 122 of adder 123, such that an error signal 124, which represents a difference between the reference input signal and observed samples from the sensor 106, is zero. Thus, so long as the movement or control operation at the output terminal 120 remains in line with the reference input signal at the second input terminal 122, the output of the actuator 104 remains constant and the observed samples from the sensor 106 match the reference input signal.

However, when the observed samples deviate from the reference input signal, for example due to a disturbance 126 or due to a change in the reference input signal at the second input terminal 122, the error signal 124 becomes non-zero. Based on this non-zero error signal, the microprocessor 102 provides control samples that tend to "tune" the output of the actuator 104 until the output on the output terminal 120 again matches the reference input signal. For example, if the frequency of the output signal is lower than dictated by the reference input signal (e.g., due to disturbance 126 or a recent change in the input reference signal), then the error signal 124 can induce an increase in the frequency of the output signal until the frequency of the output signal is as dictated by the reference input signal. Conversely, if the frequency of the output signal is higher than dictated by reference input signal, the error signal 124 can induce a decrease in the frequency of the output signal.

However, FIG. 1's system is less than optimal in that the processing unit 108 is required to manage the memory buffers 110-116 in on-going fashion, which uses system resources that could otherwise be devoted to other tasks. If the memory buffers are made "deeper", the amount of time between which the processing unit 108 can unload the buffers is increased, but processor overhead is required nonetheless. Moreover, though deeper buffers can extend the time before which the memory buffers can be unloaded, the fact the memory buffers are deeper also means that when data is eventually moved, the actual act of moving the data will take longer than if shallower memory buffers were used. Also, if the microprocessor 102 is overloaded, there is perhaps some chance that an observed sample or control sample could be missed. This chance leaves open the possibility that a dangerous condition could perhaps be missed, and the safety system 100 does not provide suitable safeguards against such a situation. Thus, FIG. 1's safety system 100 is less than ideal for several reasons.

Accordingly, aspects of the present disclosure provide for double-buffer systems and techniques using Direct Memory Access (DMA) safe linked lists. In some embodiments, a DMA controller includes a set of transaction control registers configured to receive a linked list sequence of transaction control sets. The transaction control sets collectively describe a data transfer by which the DMA controller is to move data from a peripheral alternatingly to a first memory buffer and a second memory buffer, wherein the first and second memory buffers are arranged in parallel with one another at an interface of the peripheral. The DMA controller is configured to transfer a first portion of the data from the peripheral to the first memory buffer according to a first transaction control set in the linked list sequence, and is configured to subsequently transfer a second portion of the data from the peripheral to the second buffer according to a second transaction control set in the linked list sequence. In some embodiments, a third transaction control set, which is between the first and second transaction control sets, can check that the first transaction control set executed properly. If the first transaction control set is determined to not have executed properly, the DMA controller halts execution of the sequence prior to the execution of the second transaction control set in the sequence. Thus, in addition to the DMA controller overtaking management of the first and second buffers to free up resources of the processing unit for other tasks, the DMA controller can also provide enhanced safeguards that limit the chances a dangerous condition is missed.

Figure 2:
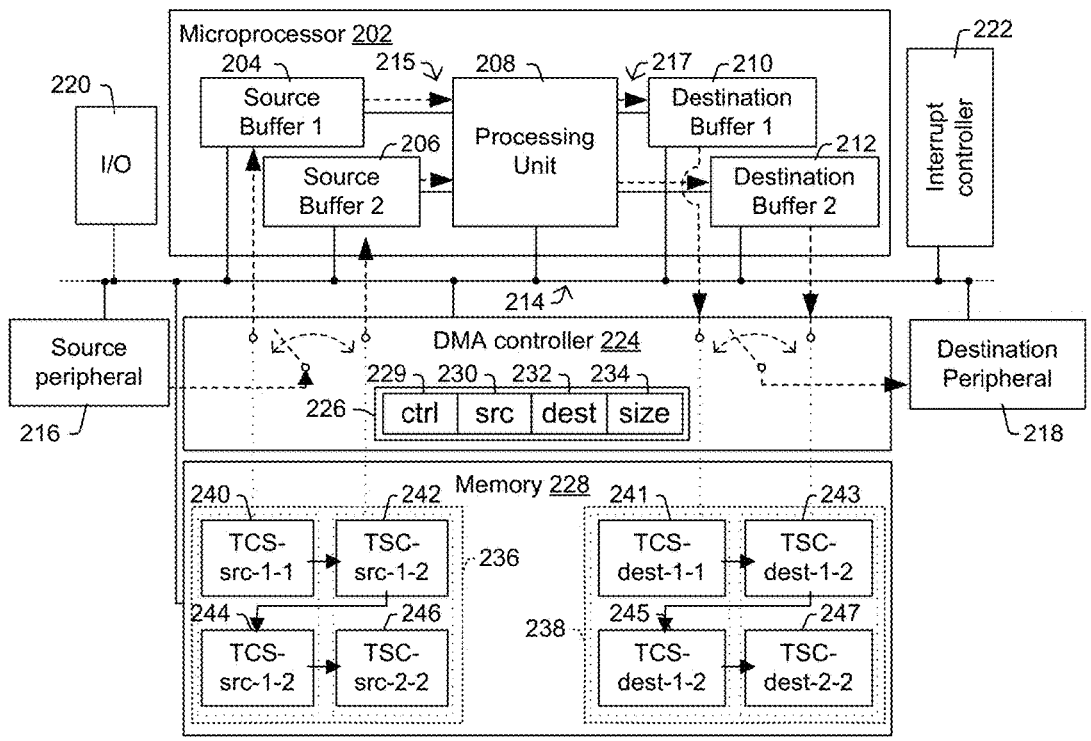
FIG. 2 shows a block diagram of safety system that makes use of a DMA controller with double buffering in accordance with some embodiments.

FIG. 2 illustrates a safety system 200 in accordance with some embodiments. The safety system 200 includes a microprocessor 202—which is made up of a first and second source memory buffers (204, 206), a processing unit 208, and first and second destination memory buffers (210, 212). A source peripheral 216, a destination peripheral 218, an input/output (I/O) module 220, and an interrupt controller 222, among other peripherals (not shown), may also be coupled to the microprocessor 202 via a system bus 214. In some embodiments, the source peripheral 216 may manifest as a sensor and the destination peripheral 218 may manifest as an actuator, and the microprocessor 202 can receive and analyze samples from the sensor via the first and second source memory buffers (204, 206) and generate and transmit a control signal for the actuator via the first and second destination memory buffers (210, 212) to keep control of the actuator in line with a reference signal, analogous to described in FIG. 1.

Each of the memory buffers (204, 206, 210, 212) is implemented as a separate memory element, such as a shift register, first-in-first-out (FIFO) memory, last-in-first-out (LIFO) memory, random access memory, or other memory storage device. Each of the source memory buffers (204, 206) and destination memory buffers (210, 212) can transfer data between the processing unit 208 and one or more peripherals (e.g., 216, 218, 220) via the system bus 214. For example, the first and second source memory buffers (204, 206) are arranged in parallel with one another, and can receive observed data samples from the source peripheral 216 via the system bus 214, and can then transfer the observed data samples to the processing unit 208 via the system bus 214 or via a first internal microprocessor bus 215. The first and second destination memory buffers (210, 212), which are also arranged in parallel with one another, can receive control samples from the processing unit 208 via the system bus 214 or via a second internal microprocessor bus 217, and can then transmit the control samples to the destination peripheral 218 via the system bus 214.

To effectuate efficient data transfer between any of the peripherals and memory buffers, a DMA controller 224 is included. The DMA controller 224 includes a set of transaction control set (TCS) registers 226. The set of TCS registers 226 includes a control field 229, source address field 230, destination address field 232, and size field 234 that describe how one or more blocks of data are to be transferred by the DMA controller 224. Based on the information in the set of TCS registers 226, the DMA controller 224 can retrieve one or more sequences of TCSs from memory 228, wherein a sequence of TCSs is arranged in a linked list structure.

In FIG. 2's example, a first TCS sequence 236 collectively describes a first data transfer by which the DMA controller 224 moves data from the source peripheral 216 to the first and second source memory buffers (204, 206); and a second TCS sequence 238 collectively describes a second data transfer by which the DMA controller 224 moves data from the first and second destination memory buffers (210, 212) to the destination peripheral 218. Though FIG. 2's example shows the first and second TCS sequences (236, 238) each containing four TCSs or four "links", where each link points to the next successive link in the sequence, it will be appreciated that any number of TCSs or "links" can be included in such a sequence. A more detailed description of how the first TCS sequence 236 and the second TCS sequence 238 operate is now described.

In the first TCS sequence 236, each TCS stored in memory 228 specifies control information, a source address, a destination address, and a size regarding one or more blocks of data to be transferred by the DMA controller 224. A DMA operation for the first TCS sequence 236 starts when the processing unit 208 loads the set of TCS registers 226 with the first source TCS 240 of the first TCS sequence 236 and/or points the DMA controller 224 to the memory address where the first source TCS 240 is stored. In FIG. 2's example, the first source TCS 240 has a source address that points to the source peripheral 216, a destination address that points to the first source memory buffer 204, and a size equal to a size of the first source memory buffer 204. Thus, the DMA controller 224 will transfer the size of data from the specified source address (e.g., source peripheral 216) to the specified destination address (e.g., first source memory buffer 204) without intervention of the processing unit 208. Accordingly, upon loading the first source TCS 240, the DMA controller 224 monitors the source peripheral 216 and when the source peripheral 216 has data that is ready, the DMA controller 224 reads the data and writes the data to the first source memory buffer 204 without intervention from the processing unit 208. In some instances where the size specified in the first source TCS 240 is the same as that of the first source memory buffer 204, the DMA controller 224 moves successive words of data from the source peripheral 216 to the first source memory buffer 204 until the first source memory buffer 204 is full. When the DMA controller 224 is finished moving the data as specified in the first source TCS 240, the DMA controller 224 identifies the location of the second source TCS 242, wherein the memory address of the second source TCS 242 is specified in the first source TCS 240.

In some cases, the second source TCS 242 can check that the first source TCS 240 executed properly. If the second source TCS determines that an error occurred during execution of the first source TCS 240, then the DMA controller 224 asserts an interrupt so the processing unit 208 can take appropriate remedial action. On the other hand, if the second source TCS 242 confirms that the first source TCS 240 executed properly, then the DMA controller 224 identifies the location of the third source TCS 244, wherein the location of the third source TCS 244 is specified in the second source TCS 242.

When the first source TCS 240 has executed properly (and the second source TCS 242 verifies proper execution), the first source memory buffer 204 is full. The illustrated first TCS sequence 236 anticipates this, and as such the third source TCS 244 specifies that when the source peripheral 216 has subsequent data that is ready to be read, the subsequent data is read from the source peripheral 216 and written to the second source memory buffer 206. Thus, more particularly, the DMA controller 224 loads the third source TCS 244, thereby identifying a source address (here the source peripheral 216), a destination address (here the second source memory buffer 206), and a data size (here the size of the second source memory buffer 206). The DMA controller 224 again monitors the source peripheral 216.

When the source peripheral 216 has data that is ready, the DMA controller 224 reads the data and writes it to the second source memory buffer 206 without intervention from the processing unit 208. While the DMA controller 224 is moving data from the source peripheral 216 to the second source memory buffer 206, the processing unit 208 can be reading and analyzing data from the first source memory buffer 204. During this time, the processing unit 208 can also be sending control samples to the destination peripheral 218 via the first and second destination memory buffers 210, 212, wherein the control samples are based on the analyzed data from the first source memory buffer 204. In some instances where the size specified in the third source TCS 244 is the same as that of the second source memory buffer 206, the DMA controller 224 moves successive words of data from the source peripheral 216 to the second source memory buffer 206 until the second source memory buffer 206 is full. When the DMA controller 224 is finished moving the data as specified in the third source TCS 244, the DMA controller 224 identifies the location of the fourth source TCS 246, wherein the location of the fourth source TCS 246 is specified in the third source TCS 244.

In some cases, the fourth source TCS 246 can check that the third source TCS 244 executed properly. If the fourth source TCS 246 confirms that the third source TCS 244 executed properly, then the DMA controller 224 identifies the location of the next source TCS (not shown), if any. In FIG. 2's example, the fourth source TCS 246 is the last "link" in the first TCS sequence 236, and the control information in the fourth source TCS 246 indicates this, and as such the DMA controller 224 can flag a first interrupt to notify the system the data movement task specified by the first TCS sequence 236 is complete. Also, if the fourth source TCS 246 determines that an error occurred during execution of the third source TCS 244, then the DMA controller 224 asserts a second interrupt so the processing unit 208 can take appropriate remedial action. These interrupts may be separate and/or have different priority levels to notify the system whether the DMA controller 224 finished in a valid state or an error state; or alternatively only a single interrupt can be asserted but different status values can be present in a status register of the DMA controller 224 to indicate whether an error state occurred or data transfer ended without an error, and the microprocessor 202 determines this by reading the status register of the DMA controller 224.

Although the first TCS sequence 236 has been illustrated and described above as containing four source TCSs (240-246), it will be appreciated that in many cases much more than four source TCSs can be included in the first TCS sequence 236. In many cases, each successive source TCS in the first TCS sequence 236 reads data from the source peripheral 216, but successive source TCSs alternate between writing data to the first source memory buffer 204 and the second source memory buffer 206. In this way, while the DMA controller 224 is writing data to one source memory buffer (e.g., 204), the other source memory buffer (e.g., 206) is frozen and/or read from by processing unit 208. For the next source TCS in the sequence, the DMA controller 224 writes data to the other source memory buffer (e.g., 206) while the one source memory buffer (e.g., 204) is frozen and/or read from by the processing unit 208. In this way, a sequence of TCSs, which are arranged as a linked list, can continuously transfer data from the source peripheral 216 to dual source memory buffers 204, 206 in alternating fashion. In other embodiments, more than two source memory buffers can be present, and successive TCSs or links can write to the source memory buffers in round-robin fashion. For example, a first TCS writes data to first source memory buffer until the first source memory is full, then a second TCS writes data to a second source memory buffer until the second source memory is full, then a third TCS writes data to a third source memory buffer until the third source memory is full, and so on. Intervening TCSs can again verify correct execution of the previous TCS before executing a data transfer specified in a subsequent TCS. Similar functionality for destination memory buffers.

Figure 3:
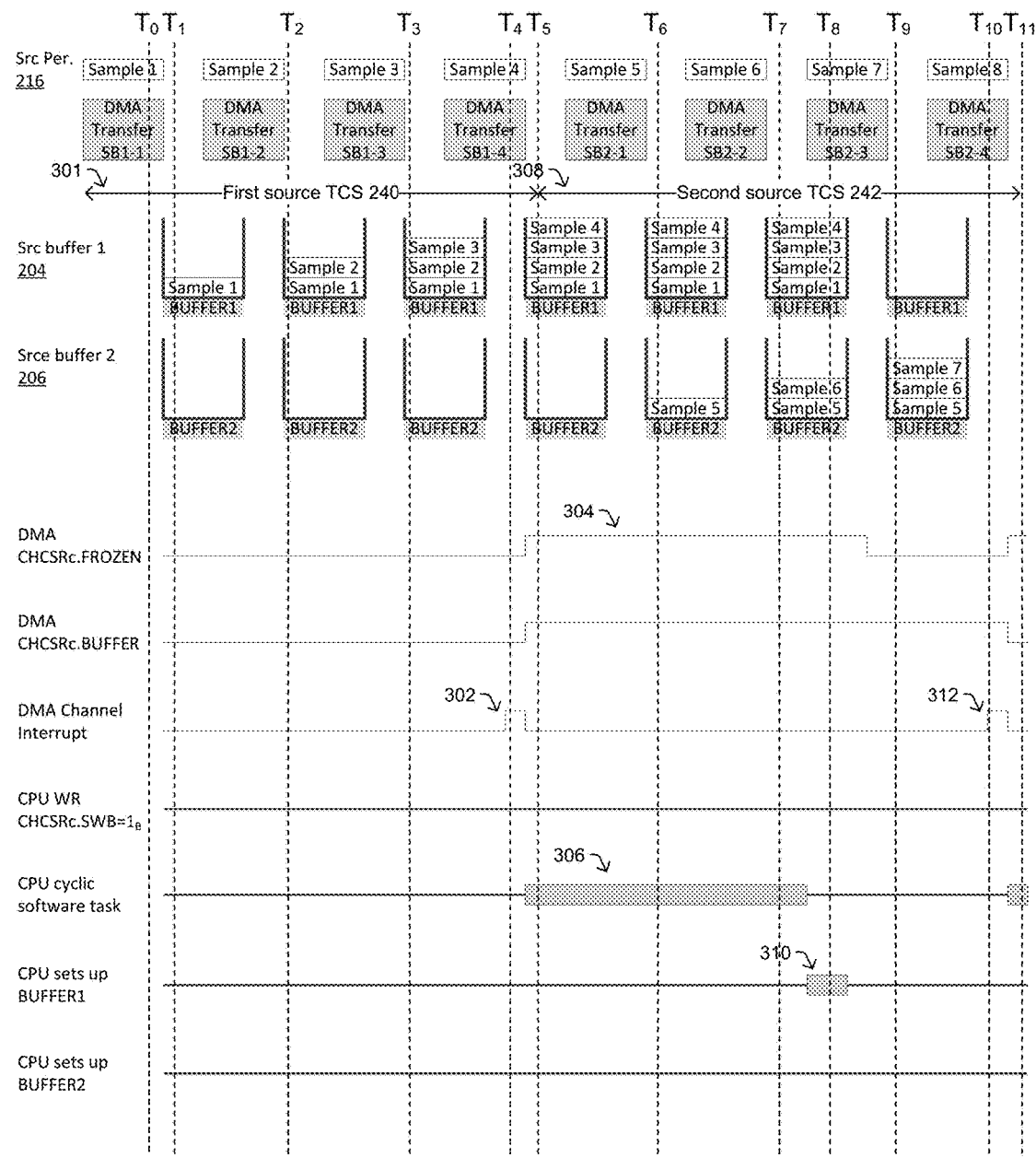
FIG. 3 shows an example of how a DMA controller can use double buffering during operation. The upper portion of FIG. 3 illustrates how samples are stored and emptied from first and second source memory buffers over time, while the lower portion of FIG. 3 illustrates a corresponding timing diagram.

FIG. 3 shows a more detailed example of some embodiments of how the DMA controller 224 of FIG. 2 can load data into the first and second source memory buffers 204, 206 during operation. The upper portion of FIG. 3 illustrates how samples are stored and emptied from the first source memory buffer 204 and second source memory buffer 206 over time, while the lower portion of FIG. 3 illustrates a corresponding timing diagram.

At time $T_0$, the source peripheral 216 has a first sample that is ready. To prepare to move the first sample from the source peripheral 216, the DMA controller 224 loads a first source TCS 240 (301) into its set of TCS registers. In FIG. 3's example, the first source TCS 240 specifies a source address of the source peripheral 216, a destination address of the first source memory buffer 204, and a data size of four samples (e.g., four words, which corresponds to the size of the first source memory buffer in this example). Of course, in other embodiments the first source memory buffer 204 is often much larger than 4 words, for example on the order of hundreds of bytes, thousands of bytes, millions of bytes, and so on; but four samples/words is illustrated herein for clarity of understanding.

At time T1, the DMA controller 224 moves the first sample from the source peripheral 216 to the first source memory buffer 204. With each sample that is moved, the DMA controller 224 keeps track of the total data size that has been moved for the first source TCS 240. Thus, at time T1, one sample has been moved and the data size of four samples to be moved has not yet been reached.

At time T2, after the source peripheral 216 has a second sample that is ready, the DMA controller 224 moves the second sample to the first source memory buffer 204. Thus, at time T2, two samples have been moved and the data size of four samples to be moved has not yet been reached.

At time T3, after the source peripheral 216 has a third sample that is ready, the DMA controller 224 moves the third sample to the first source memory buffer 204. Thus, at time T3, three samples have been moved and the data size of four samples to be moved has not yet been reached.

At time T4, after the source peripheral 216 has a fourth sample that is ready, the DMA controller 224 moves the fourth sample to the first source memory buffer 204. At this time, the DMA controller 224 determines that the data size of 4 samples has been moved, as dictated by the first source TCS 240. Therefore, the DMA controller 224 can assert an interrupt 302 at time T4 to notify the processing unit 208 that the first source memory buffer 204 is full, and the processing unit 208 can analyze the samples stored in the source memory buffer 204.

At time T5, the processing unit 208 freezes (304) the first source memory buffer 204, and also begins to analyze (306) the data samples stored in the first source memory buffer 204. The DMA controller 224 can also now identify, based on the control information in the first source TCS 240, whether the sequence of TCSs includes a second TCS. In this example, a second source TCS 242 is included in the sequence (and is pointed to by the first source TCS 240), and so the DMA controller 224 loads the second source TCS 242 (308). In FIG. 3's example, the second source TCS 242 specifies a source address of the source peripheral 216 and a destination address of the second source memory buffer 206. The second source memory buffer 206 has a buffer size of 4 samples and the data size specified in the second source TCS 242 is also four samples.

At time T6, the DMA controller 224 moves the fifth sample from the source peripheral 216 to the second source memory buffer 206. With each sample that is moved, the DMA controller 224 again keeps track of the total data size that has been moved for the second source TCS 242. Thus, at time T6, one sample has been moved for the second source TCS 242 and the data size of four samples to be moved has not yet been reached. The processing unit 208 continues to analyze (306) the samples in the first source memory buffer 204 during time T6.

At time T7, after the source peripheral 216 has a sixth sample that is ready, the DMA controller 224 moves the sixth sample to the second source memory buffer 206. Thus, at time T7, two samples have been moved for the second source TCS 242 and the data size of four samples to be moved has not yet been reached.

At time T8 the processing unit 208 has now completed analysis of the samples in the first source memory buffer 204. Accordingly, the processing unit 208 sets up (310) the first source memory buffer 204 for another set of data to be received, for example, by clearing the samples stored in the first source memory buffer 204.

At time T9, after the source peripheral 216 has a seventh sample that is ready, the DMA controller 224 moves the seventh sample to the second source memory buffer 206. Thus, at time T9, three samples have been moved for the second source TCS 242 and the data size of four samples to be moved has not yet been reached. Thus, even though the first source memory buffer 204 is again available to be written to, the DMA controller 224 continues to write data samples to the second source memory buffer 206.

At time T10, after the source peripheral 216 has a fourth sample that is ready, the DMA controller 224 moves the fourth sample to the second source memory buffer 206 (not shown). At this time, the DMA controller 224 determines that the data size of 4 samples has been moved to the second source memory buffer 206, as dictated by the second source TCS 242. Therefore, the DMA controller 224 can assert an interrupt (312) at time T11 to notify the processing unit 208 that the second source memory buffer 206 is full. The DMA controller 224 can again determine if another source TCS is present in the sequence or if the second source TCS 242 was the last link in the sequence; and continue to write data as specified in the source TCSs and alternately write data between the first and second source memory buffers (204, 206). For example, a third source TCS 244 can then transfer data from the source peripheral 216 to the first source memory buffer 204; and subsequently a fourth source TCS can transfer data from the source peripheral to the second source memory buffer 206, as previously described in FIG. 2.

Figure 4:
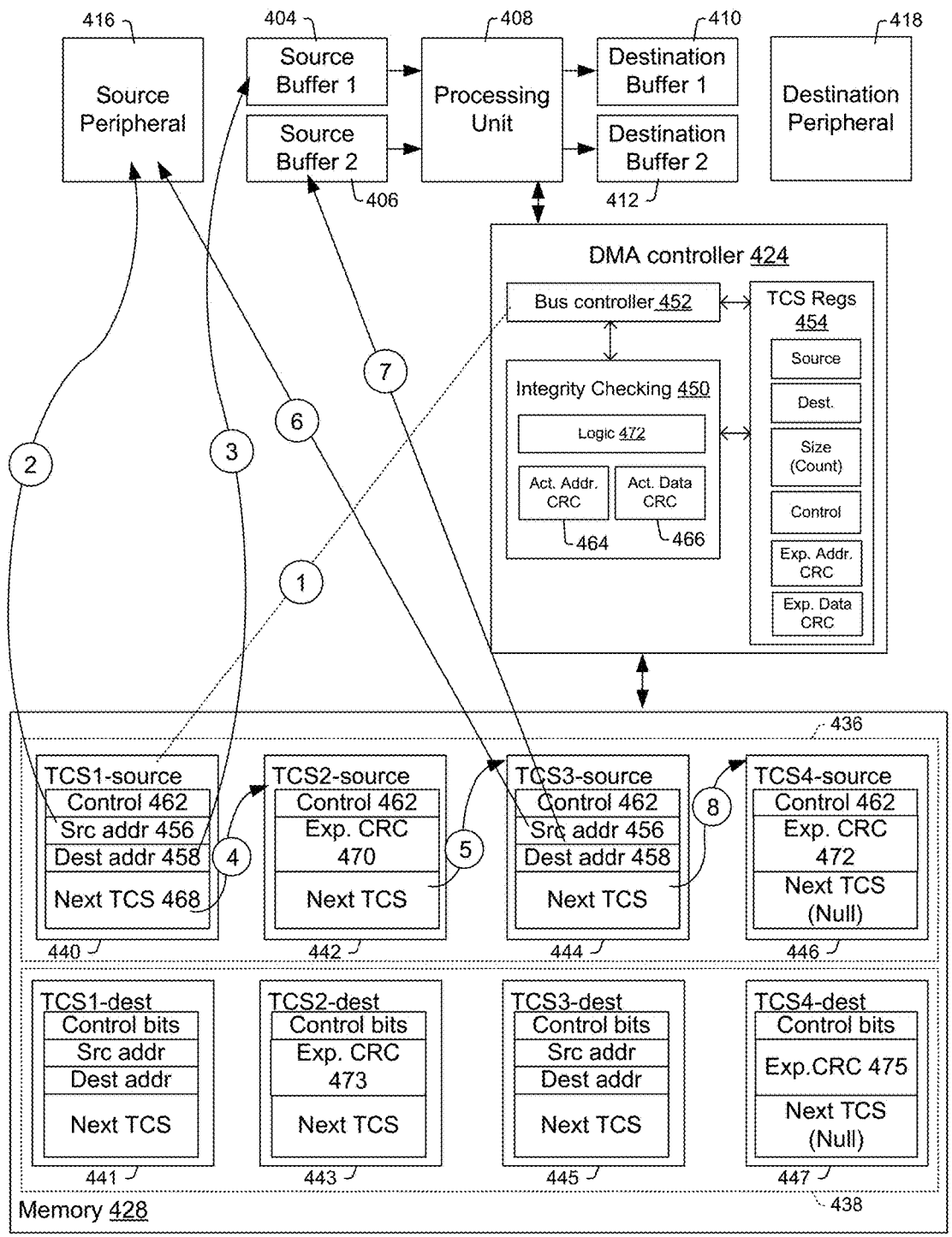
FIGS. 4-5-collectively illustrate data transfer in a safety system.
Figure 5:
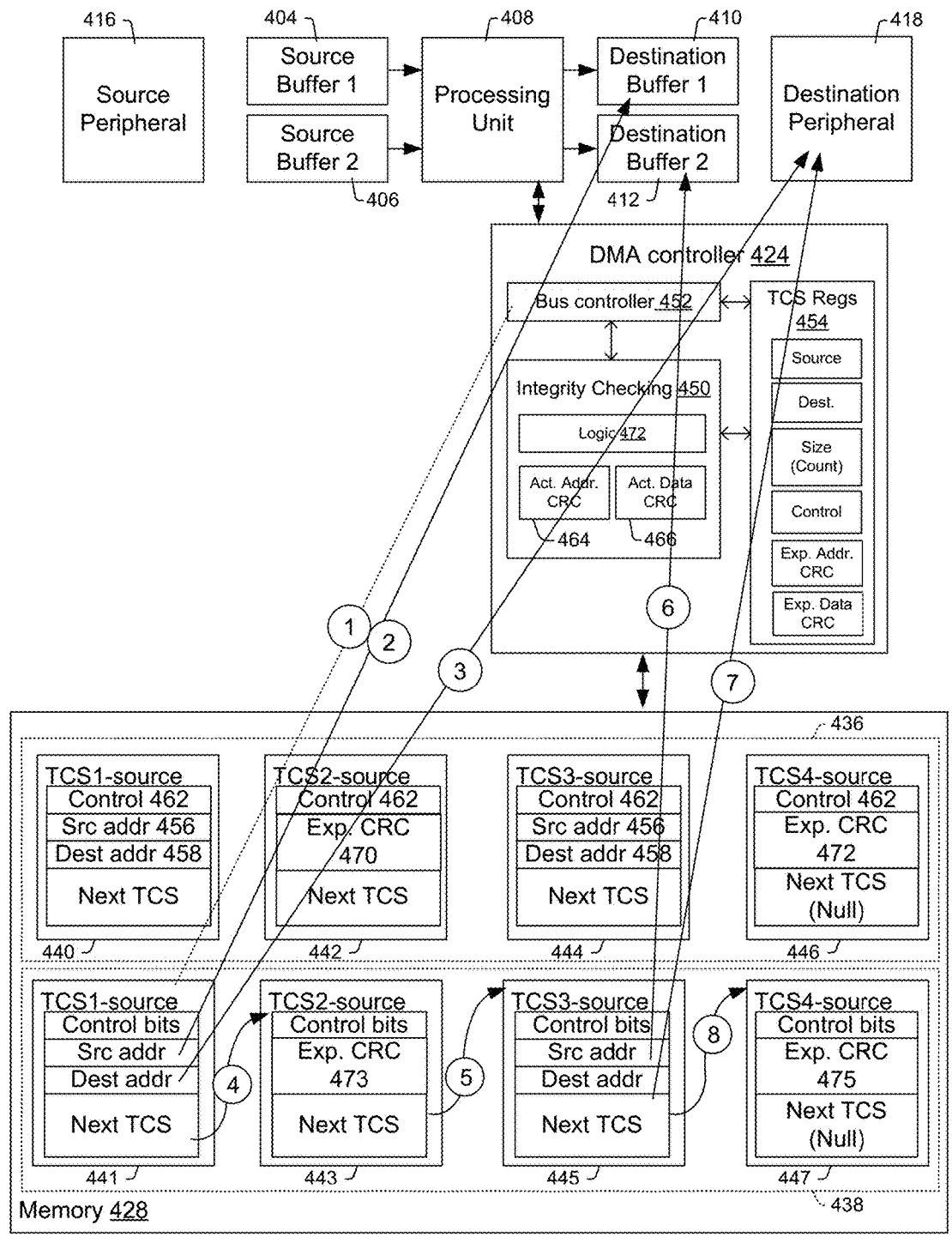

Turning now to FIGS. 4-5, one can see additional depictions of some embodiments of a safety system 400 in accordance with the present disclosure. Briefly, FIG. 4 shows the safety system 400 as a DMA controller 424 moves data from a source peripheral 416 to first and second source memory buffers 404, 406 using a first TCS sequence 436; while FIG. 5 shows the safety system 400 as the DMA controller 424 moves data from first and second destination memory buffers 410, 412 to a destination peripheral 418 using a second TCS sequence 438.

In FIGS. 4-5, the DMA controller 424 includes an integrity checking module 450, bus controller 452, and transaction control set (TCS) registers 454. As will be appreciated in greater detail herein, a DMA operation can start when the processing unit 408 loads TCS registers 454 with a first transaction control set (TCS) of a linked list structure. This first TCS specifies a source address, destination address, size, and control information regarding one or more blocks of data to be transferred within memory 428, as well as an address of the next link, if any, in the TCS sequence.

In FIG. 4, the first source TCS 440 is written to the TCS registers 454 (see numeral 1), and the bus controller 452 then carries out the data transfer specified by the first source TCS 440, for example, by reading one or more words of data from the source peripheral 416 (see numeral 2), and writing those words to the first source buffer 404 (see numeral 3). As each word is transferred, the integrity checking module 450 calculates an actual cyclic redundancy checksum. This actual cyclic redundancy checksum can take the form of an actual address cyclic redundancy checksum (stored in actual address CRC register 464), which is based on the memory addresses actually accessed by the DMA controller 424 while executing the first source TCS 440. The actual cyclic redundancy checksum can also take the form of an actual data cyclic redundancy checksum (stored in actual data CRC register 466), which is based on the data actually transferred by the DMA controller 424 while executing the first source TCS 440.

After data specified by the first source TCS 440 has been transferred, the DMA controller 424 identifies the second source TCS 442 (see numeral 4), based on a pointer field 468 contained in the first source TCS 440. The DMA controller 424 then loads the second source TCS 442. The second source TCS 442 defines a safe linked list operation that verifies that the first source TCS 440 executed properly. In particular, the second source TCS 442 includes an expected cyclic redundancy checksum 470; and thus, logic 472 in the DMA controller 424 can compare the expected cyclic redundancy checksum 470 to the actual cyclic redundancy checksum (e.g., stored in 464 or 466) calculated for the first source TCS 440. If the actual cyclic redundancy checksum(s) stored in 464/466 is different from the expected cyclic redundancy checksum(s) in 470, the DMA controller 424 halts data transfers and flags an error (e.g., an interrupt IRQ) to limit damage. If no error is detected, the DMA controller 424 identifies the next source TCS in the first TCS sequence 436 (see numeral 5) without flagging an interrupt so the processing unit 408 can continue with other tasks uninterrupted. Thus, by comparing the actual and expected cyclic redundancy checksums and putting adequate safeguards in place, the DMA controller 424 helps to ensure that the DMA has read data from the correct source address and written data to the correct destination addresses.

The third source TCS 444 is then written to the TCS registers 454, and the bus controller 452 carries out the data transfer specified by the third source TCS 444, for example, by reading one or more words of data from the source peripheral 416 (see numeral 6), and writing those words to the second source buffer 406 (see numeral 7). The first source buffer 404 is typically full at this point, and as such is frozen and/or being read from by the processing unit 408. As each word is transferred from the source peripheral 416 to the second source buffer 406, the integrity checking module 450 calculates an actual cyclic redundancy checksum. This actual cyclic redundancy checksum can take the form of an actual address cyclic redundancy checksum (stored in actual address CRC register 464), which is based on the memory addresses actually accessed by the DMA controller 424 while executing the third source TCS 444. The actual cyclic redundancy checksum can also take the form of an actual data cyclic redundancy checksum (stored in actual data CRC register 466), which is based on the data actually transferred by the DMA controller 424 while executing the third source TCS 444.

After data specified by the third source TCS 444 has been transferred, the DMA controller 424 identifies the fourth source TCS 446 (see numeral 8), based on a pointer field contained in the third source TCS 444. The DMA controller 424 then loads the fourth source TCS 446. The fourth source TCS 446 defines a safe linked list operation that verifies that the third source TCS 444 executed properly. In particular, the fourth source TCS 446 includes an expected cyclic redundancy checksum 471; and thus, logic 472 in the DMA controller 424 can compare the expected cyclic redundancy checksum 471 to the actual cyclic redundancy checksum (e.g., stored in 464 or 466) calculated for the third source TCS 444. If the actual cyclic redundancy checksum(s) stored in 464/466 is different from the expected cyclic redundancy checksum(s) in 471, the DMA controller 424 halts data transfers and flags an error (e.g., an interrupt IRQ) to limit damage. If no error is detected, the DMA controller 424 identifies the next source TCS, if any, in the first TCS sequence 436. Thus, by comparing the actual and expected cyclic redundancy checksums and putting adequate safeguards in place, the DMA controller 424 helps to ensure data has been moved accurately. When the last source TCS in the first sequence is reached, the DMA controller 424 can assert an interrupt to notify the processing unit the specified data transfer is complete.

In FIG. 5, the first destination TCS 441 is written to the TCS registers 454 (see numeral 1), and the bus controller 452 then carries out the data transfer specified by the first destination TCS 441, for example, by reading one or more words of data from the destination buffer 410 (see numeral 2), and writing those words to the destination peripheral 418 (see numeral 3). As each word is transferred, the integrity checking module 450 calculates an actual cyclic redundancy checksum. This actual cyclic redundancy checksum can take the form of an actual address cyclic redundancy checksum (stored in actual address CRC register 464), which is based on the memory addresses actually accessed by the DMA controller 424 while executing the first destination TCS 441. The actual cyclic redundancy checksum can also take the form of an actual data cyclic redundancy checksum (stored in actual data CRC register 466), which is based on the data actually transferred by the DMA controller 424 while executing the first destination TCS 441.

After data specified by the first destination TCS 441 has been transferred, the DMA controller 424 identifies the second destination TCS 443 (see numeral 4), based on a pointer field contained in the first destination TCS 441. The DMA controller 424 then loads the second destination TCS 443. The destination second TCS 443 defines a safe linked list operation that verifies that the first destination TCS 441 executed properly. In particular, the second destination TCS 443 includes an expected cyclic redundancy checksum 473; and thus, logic 472 in the DMA controller 424 can compare the expected cyclic redundancy checksum 473 to the actual cyclic redundancy checksum (e.g., stored in 464 or 466) calculated for the first destination TCS 441. If the actual cyclic redundancy checksum(s) stored in 464/466 is different from the expected cyclic redundancy checksum(s) in 473, the DMA controller 424 halts data transfers and flags an error (e.g., an interrupt IRQ) to limit damage. If no error is detected, the DMA controller 424 identifies the next TCS in the second TCS sequence 438 (see numeral 5) without flagging an interrupt so the processing unit 408 can continue with other tasks un-interrupted. For example, the processing unit can continue analyzing data in the first and/or second source buffers 404, 406, and/or can be writing control samples to the second destination buffer 412 which is frozen. Thus, by comparing the actual and expected cyclic redundancy checksums and putting adequate safeguards in place, the DMA controller 424 helps to ensure data has been moved accurately.

The third destination TCS 445 is then written to the TCS registers 454, and the bus controller 452 carries out the data transfer specified by the third destination TCS 445, for example, by reading one or more words of data from the second destination buffer 412 (see numeral 6), and writing those words to the destination peripheral 418 (see numeral 7). The first destination buffer 404 has been fully read or emptied at this point, and as such is frozen and/or being re-filled by the processing unit 408. As each word is transferred from the second destination buffer 412 to the destination peripheral 418, the integrity checking module 450 calculates an actual cyclic redundancy checksum. This actual cyclic redundancy checksum can take the form of an actual address cyclic redundancy checksum (stored in actual address CRC register 464), which is based on the memory addresses actually accessed by the DMA controller 424 while executing the third destination TCS 445. The actual cyclic redundancy checksum can also take the form of an actual data cyclic redundancy checksum (stored in actual data CRC register 466), which is based on the data actually transferred by the DMA controller 424 while executing the third destination TCS 445.

After data specified by the third destination TCS 445 has been transferred, the DMA controller 424 identifies the fourth destination TCS 447 (see numeral 8), based on a pointer field contained in the third destination TCS 445. The DMA controller 424 then loads the fourth destination TCS 447. The fourth destination TCS 447 defines a safe linked list operation that verifies that the third destination TCS 445 executed properly. In particular, the fourth destination TCS 447 includes an expected cyclic redundancy checksum 475; and thus, logic 472 in the DMA controller 424 can compare the expected cyclic redundancy checksum 475 to the actual cyclic redundancy checksum (e.g., stored in 464 or 466) calculated for the third destination TCS 445. If the actual cyclic redundancy checksum(s) stored in 464/466 is different from the expected cyclic redundancy checksum(s) in 475, the DMA controller 424 halts data transfers and flags an error (e.g., an interrupt IRQ) to limit damage. If no error is detected, the DMA controller 424 identifies the next TCS, if any, in the second TCS sequence 438. When the last TCS in the second sequence is reached, the DMA controller 424 can assert an interrupt to notify the processing unit the specified data transfer is complete.

It will be appreciated that "cyclic redundancy checksum" as referred to herein can be used to detect a data error present in bits, words, or other sizes of data. The term cyclic redundancy checksum can include, but is not limited to error detection codes, parity bit(s), and hash values, among others. In some instances, an error detection code can be implemented as an error correction code, wherein the information in the error correction code not only detects whether an error is present but also helps to correct the error.

Figure 6:
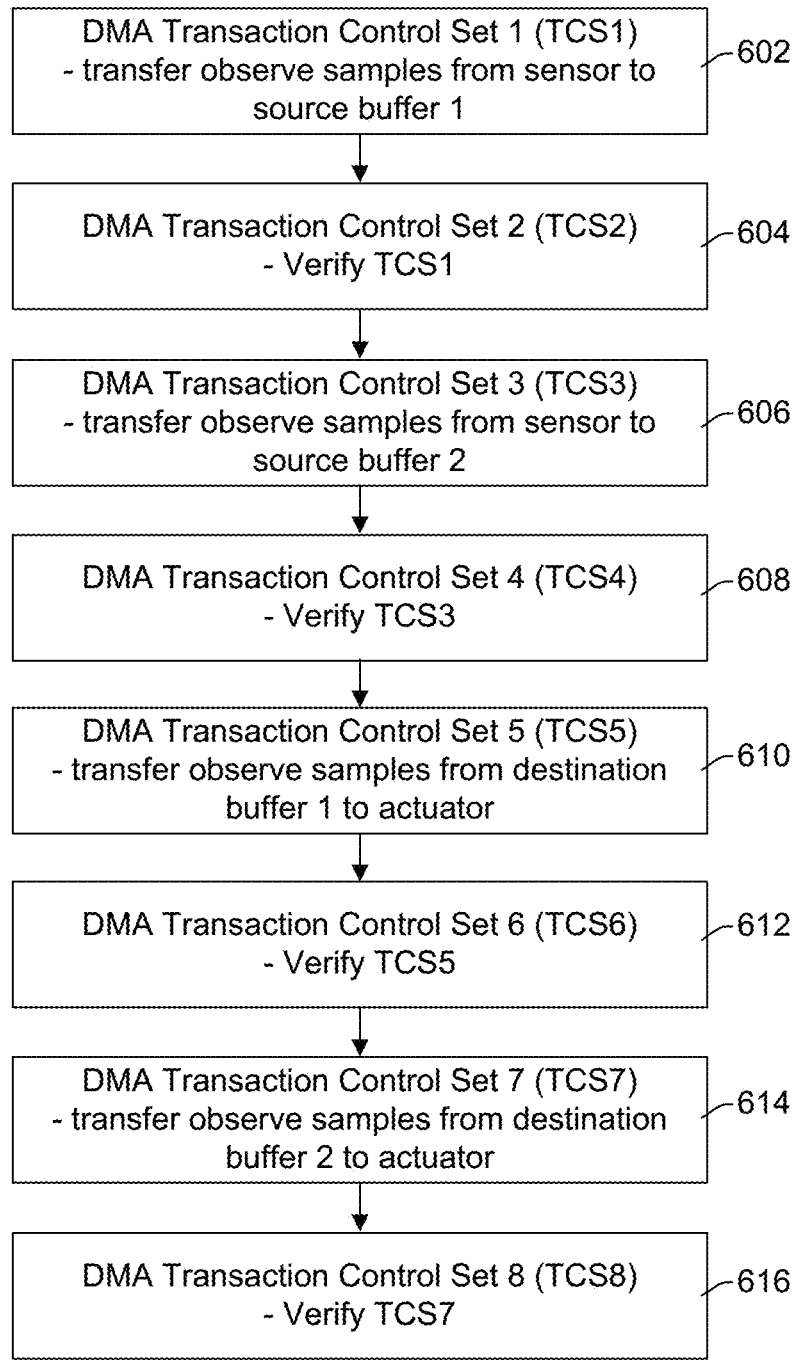
FIG. 6 illustrates a method of data transfer in a safety system with a DMA controller that uses double buffering and safe linked lists.

Turning now to FIG. 6, one can see a flow chart illustrating a method in accordance with some embodiments of the present disclosure. The method starts at 602, when a first DMA Transaction Control Set (TCS1) is used to transfer observed samples from a sensor to a first source memory buffer. In some cases, TCS1 specifies a data size to be transferred is the same as the size of the first source memory buffer, such that TCS1 fills the first source memory buffer. In some cases, a second source memory buffer is frozen while TCS1 is executing, and/or a processing unit can be reading from the second source memory buffering while TCS1 is executing.

At 604, a second DMA Transaction Control Set (TCS2), a base address of which is pointed to by the first DMA Transaction Control Set, is used to verify TCS1 executed correctly.

At 606, a third DMA Transaction Control Set (TCS3), a base address of which is pointed to by the second DMA Transaction Control Set, is used to transfer observed samples from the sensor to a second source memory buffer. In some cases, TCS3 specifies a data size to be transferred is the same as the size of the second source memory buffer, such that TCS3 fills the second source memory buffer. In some cases, the first source memory buffer is frozen while TCS3 is executing, and/or a processing unit can be reading from the first source memory buffering while TCS3 is executing.

At 608, a fourth DMA Transaction Control Set (TCS4), a base address of which is pointed to by the third DMA Transaction Control Set, is used to verify TCS3 executed correctly.

At 610, a fifth DMA Transaction Control Set (TCS5) is used to transfer control samples from a first destination memory buffer sensor to a destination peripheral. In some cases, TCS5 specifies a data size to be transferred is the same as the size of the first destination memory buffer, such that TCS5 moves the entire contents of the first destination memory buffer to the destination peripheral. In some cases, a second destination memory buffer is frozen while TCS5 is executing, and/or a processing unit can be writing to the second destination memory buffering while TCS5 is executing.

At 612, a sixth DMA Transaction Control Set (TCS6), a base address of which is pointed to by the fifth DMA Transaction Control Set, is used to verify TCS5 executed correctly.

At 614, a seventh DMA Transaction Control Set (TCS7), a base address of which is pointed to by the sixth DMA Transaction Control Set, is used to transfer control samples from a second destination memory buffer to the destination peripheral. In some cases, TCS7 specifies a data size to be transferred is the same as the size of the second destination memory buffer, such that TCS7 moves the entire contents of the second destination memory buffer to the destination peripheral. In some cases, the first destination memory buffer is frozen while TCS7 is executing, and/or the processing unit can be reading from the first destination memory buffering while TCS7 is executing.

At 616, an eighth DMA Transaction Control Set (TCS8), a base address of which is pointed to by the seventh DMA Transaction Control Set, is used to verify TCS7 executed correctly.

It is to be understood that in the description of embodiments contained herein any direct connection or coupling between functional blocks, devices, components, circuit elements or other physical or functional units shown in the drawings or described herein could also be implemented by an indirect connection or coupling, i.e., a connection or coupling comprising one or more intervening elements. Furthermore, it should be appreciated that functional blocks or units shown in the drawings may be implemented as separate circuits in some embodiments, but may also be fully or partially implemented in a common circuit or common integrated circuit in other embodiments, or in some cases may also be implemented jointly by programming a processor accordingly.

It should be noted that the drawings are provided to give an illustration of some aspects and features of embodiments of the present invention and are to be regarded as schematic only. In particular, the elements shown in the drawings are not necessarily to scale with each other, and the placement of various elements in the drawings is chosen to provide a clear understanding of the respective embodiment and is not to be construed as necessarily being a representation of the actual relative location of the various components and elements shown. The features of the various embodiments described herein may be combined with each other. On the other hand, describing an embodiment with a plurality of features is not to be construed as indicating that all those features are necessary for practicing the present invention, as other embodiments may comprise less features and/or alternative features.

What is claimed is:

1. A Direct Memory Access (DMA) controller, comprising:
    a set of transaction control registers configured to receive a sequence of transaction control sets which are arranged in a linked list and which collectively describe a data transfer by which the DMA controller is to move data, wherein the data transfer is to move the data from a peripheral and alternatingly to a first memory buffer and a second memory buffer, the first and second memory buffers being arranged in parallel with one another at an interface of the peripheral; and
    wherein the DMA controller is configured to transfer a first portion of the data from the peripheral to the first memory buffer according to a first transaction control set in the sequence, and is configured to subsequently transfer a second portion of the data from the peripheral to the second memory buffer according to a second transaction control set in the sequence; and
    an integrity checker configured to determine an actual error detection code based on the first and/or second portions of the data or an address actually processed by the DMA controller during execution of the first and/or second transaction control sets, the integrity checker being further configured to selectively flag an error based on whether the actual error detection code is the same as an expected error detection code contained in a third transaction control set in the sequence.

2. The DMA controller of claim 1, wherein the DMA controller is configured to read the data to be moved in the data transfer from the peripheral, and write a first number of consecutive words of the read data to the first memory buffer according to the first transaction control set and to subsequently write a second number of consecutive words of the read data to the second memory buffer according to the second transaction control set.

3. The DMA controller of claim 2, wherein the DMA controller is configured to write the first number of consecutive words to the first memory buffer until the first memory buffer is full and, only when the first memory buffer is full, then switch to write the second number of consecutive words to the second memory buffer.

4. The DMA controller of claim 2, wherein after the DMA controller writes the second number of consecutive words to the second memory buffer, the DMA controller is configured to selectively switch back to write additional data from the peripheral to the first memory buffer based on whether the second memory buffer is full.

5. The DMA controller of claim 1, wherein the third transaction control set is arranged at a position in the sequence between the first and second transaction control sets.

6. The DMA controller of claim 1, wherein the integrity checker is configured to determine the actual error detection code based on the first portion of the data moved to the first memory buffer.

7. The DMA controller of claim 1, wherein the integrity checker is configured to determine the actual error detection code based on the address.

8. A system, comprising:
a first peripheral;
a processing unit operably coupled to the first peripheral;
a first memory buffer coupled between the first peripheral and the processing unit;
a second memory buffer coupled between the first peripheral and the processing unit and being arranged in parallel with the first memory buffer; and
a direct memory access (DMA) controller coupled to the first peripheral, the first buffer, and the second buffer; the DMA controller including a set of transaction control registers configured to receive a first sequence of transaction control sets that collectively describe a first data transfer by which the DMA controller moves data between the first peripheral and the first memory buffer and the second memory buffer; and
wherein the DMA controller is configured to transfer a first portion of the data between the first memory buffer and the peripheral according to a first transaction control set in the first sequence, and is configured to subsequently transfer a second portion of the data between the second buffer and the first peripheral according to a second transaction control set in the first sequence; and
an integrity checker configured to determine an actual error detection code based on the first and/or second portions of the data or an address actually processed by the DMA controller during execution of the first and/or second transaction control sets, the integrity checker further configured to selectively flag an error based on whether the actual error detection code is the same as an expected error detection code contained in a third transaction control set in the first sequence.

9. The system of claim 8, wherein the first peripheral is a source peripheral and the DMA controller is configured to read the data from the source peripheral and write a first portion of the read data to the first memory buffer and write a second portion of the read data to the second memory buffer.

10. The system of claim 9, wherein the first portion of the data includes multiple words which are written to the first memory buffer, and the second portion of the data includes multiple words which are written to the second memory buffer only after all of the first portion of the data has been written to the first memory buffer.

11. The system of claim 9, wherein the DMA controller is configured to switch from writing the first portion of the data to writing the second portion of the data at a time corresponding to when the first memory buffer is completely full.

12. The system of claim 8, wherein the first peripheral is a destination peripheral and the DMA controller is configured to alternatingly:
read the entire contents of the first memory buffer and write the entire contents of the first memory buffer to the destination peripheral according to the first transaction control set; and
read the entire contents of the second memory buffer and write the entire contents of the second memory buffer to the destination peripheral according to the second transaction control set.

13. The system of claim 8, further comprising:
a second peripheral;
a third memory buffer coupled between the second peripheral and the processing unit; and
a fourth memory buffer coupled between the second peripheral and the processing unit and being arranged in parallel with the third memory buffer; and
wherein the DMA controller is configured to receive a second sequence of transaction control sets that collectively describe a second data transfer by which the DMA controller moves data between the second peripheral and the third memory buffer and the fourth memory buffer;
wherein the DMA controller is further configured to transfer a first portion of data to be moved between the third memory buffer and the second peripheral according to a first transaction control set in the second sequence, and is configured to subsequently transfer a second portion of the data to be moved between the fourth buffer and the second peripheral according to a second transaction control set in the second sequence.

14. The system of claim 13, wherein the processing unit is configured to generate the first portion of data to be moved between the third memory buffer and the second peripheral based on the first portion of the data.

15. The DMA controller of claim 8, wherein the third transaction control set is arranged at a position in the sequence between the first and second transaction control sets.

16. The system of claim 8, further comprising:
a second peripheral;
a third memory buffer coupled between the second peripheral and the processing unit; and
a fourth memory buffer coupled between the second peripheral and the processing unit and being arranged in parallel with the third memory buffer; and
wherein the DMA controller is configured to transfer a third set of data between the third memory buffer and the second peripheral according to a first transaction control set in a second sequence of transaction control sets which are arranged in a linked list, and is configured to subsequently transfer a fourth set of data between the fourth memory buffer and the second peripheral according to a second transaction control set in the second sequence.

17. The DMA controller of claim 8, wherein the integrity checker is configured to determine the actual error detection code based on the data moved between the first peripheral and the first buffer and the second buffer.

18. A method for transferring data from a peripheral alternatingly to a first memory buffer and a second memory buffer, the first and second memory buffers being arranged in parallel with one another at an interface of the peripheral, the method comprising:
receiving a sequence of transaction control sets at a DMA controller, wherein the sequence of transaction control sets are arranged in a linked list structure in memory and collectively describe a data transfer from the peripheral alternatingly to the first memory buffer and the second memory buffer;

based on a first transaction control set in the sequence of transaction control sets, reading the entire contents of the first memory buffer and writing the entire contents of the first memory buffer to the peripheral; and after the entire contents of the first memory buffer have been written to the peripheral, reading the entire contents of the second memory buffer and writing the entire contents of the second memory buffer to the peripheral based on a second transaction control set in the sequence of transaction control sets; and determining an actual error detection code based on contents of the first memory buffer and/or contents of the second memory buffer which were actually processed by the DMA controller during execution of the first and/or second transaction control sets.

19. The method of claim 18, further comprising:

reading a third transaction control set which is included the sequence and which includes an expected error detection code; and selectively flagging an error based on whether the actual error detection code is the same as the expected error detection code.

20. The method of claim 19, wherein the third transaction control set is arranged at a position in the sequence between the first transaction control set and the second transaction control set.

* * * * *